No. 762,868. PATENTED JUNE 21, 1904.
H. A. ALLEN.
APPARATUS FOR SEPARATING MATERIALS OF DIFFERENT GRAVITIES.
APPLICATION FILED JULY 23, 1902.
NO MODEL. 4 SHEETS—SHEET 2.
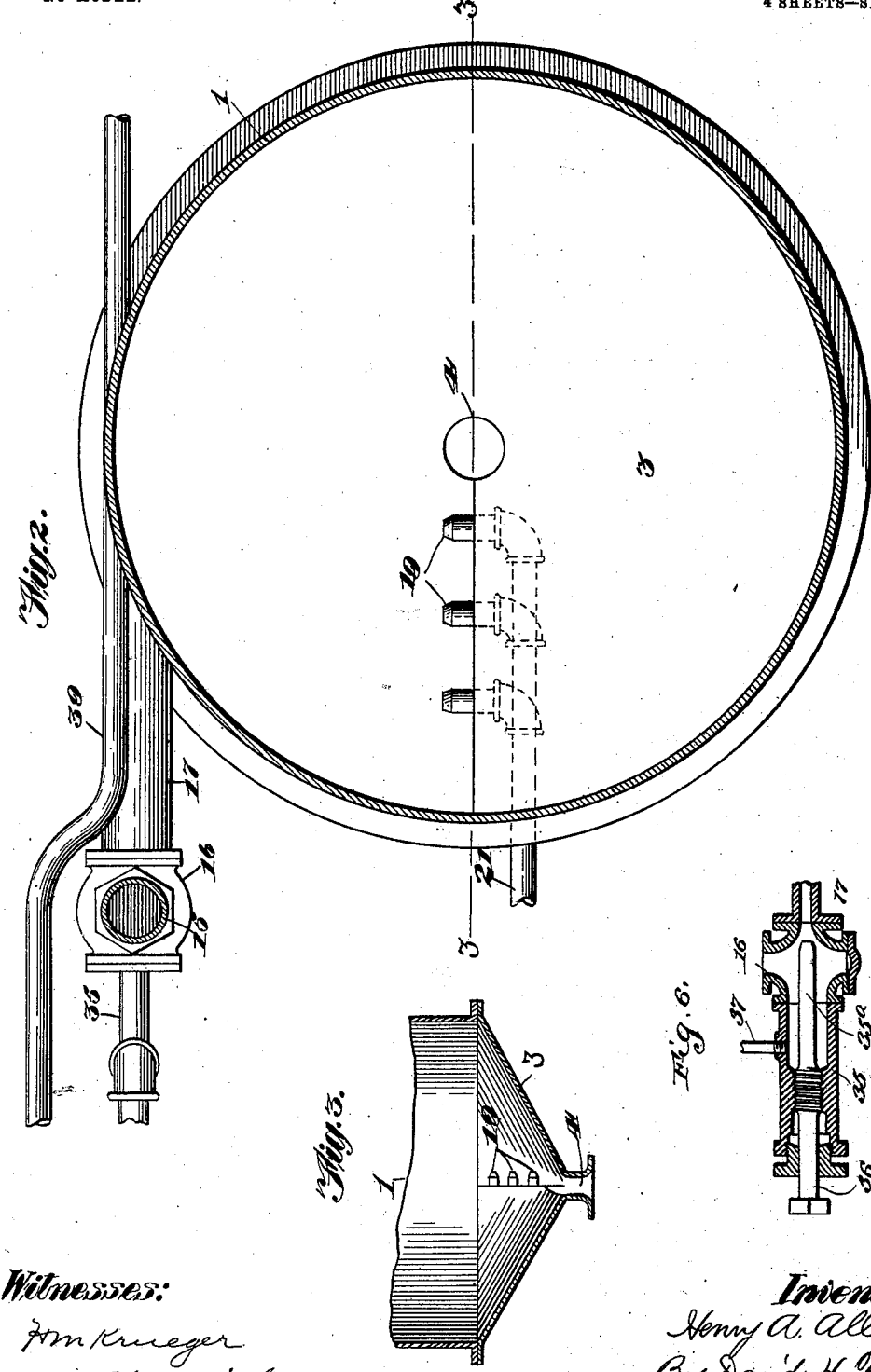
Witnesses:
Inventor:
Henry A. Allen
By David H. Fletcher
Atty.

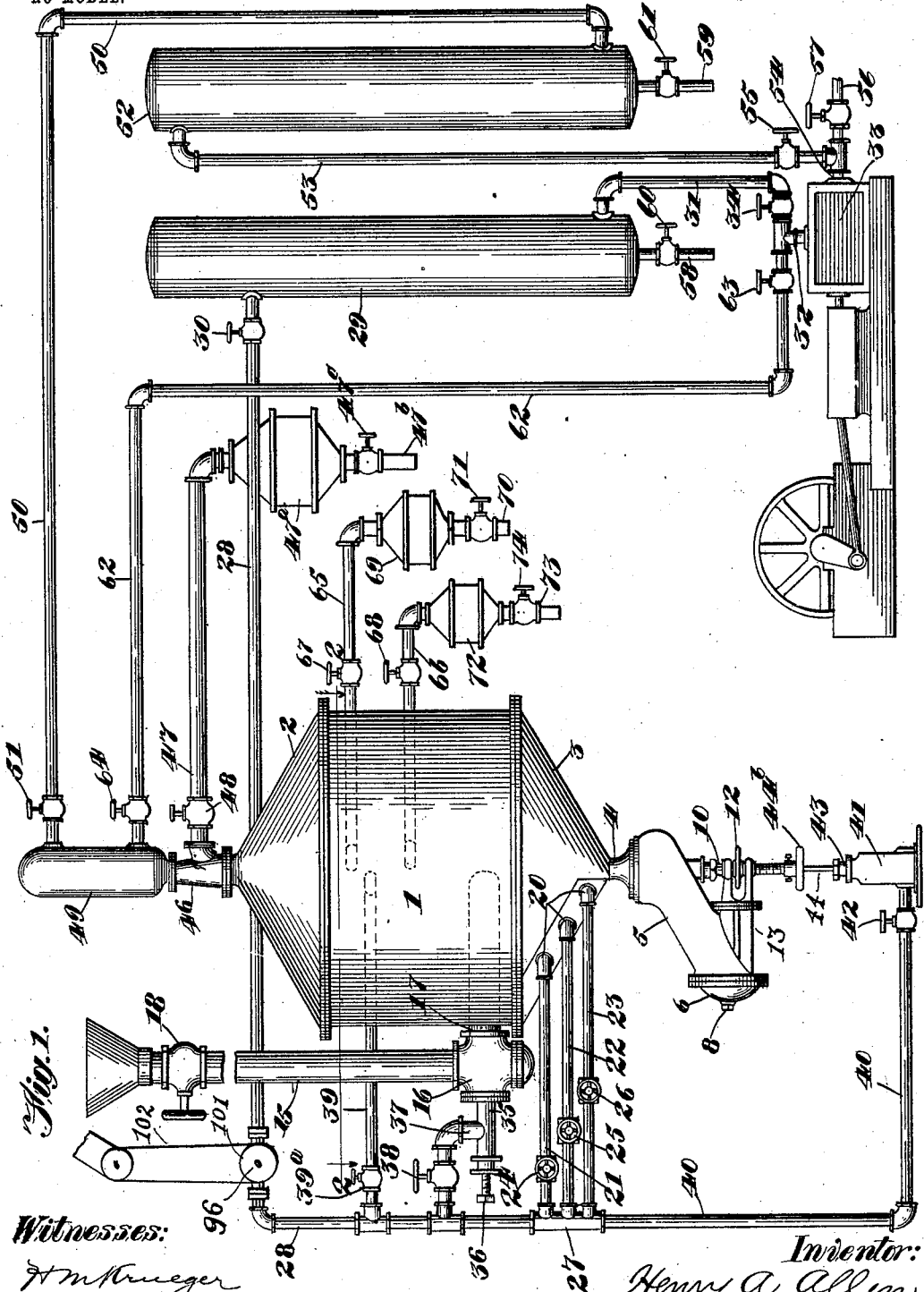

No. 762,868. PATENTED JUNE 21, 1904.
H. A. ALLEN.
APPARATUS FOR SEPARATING MATERIALS OF DIFFERENT GRAVITIES.
APPLICATION FILED JULY 23, 1902.
NO MODEL. 4 SHEETS—SHEET 3.
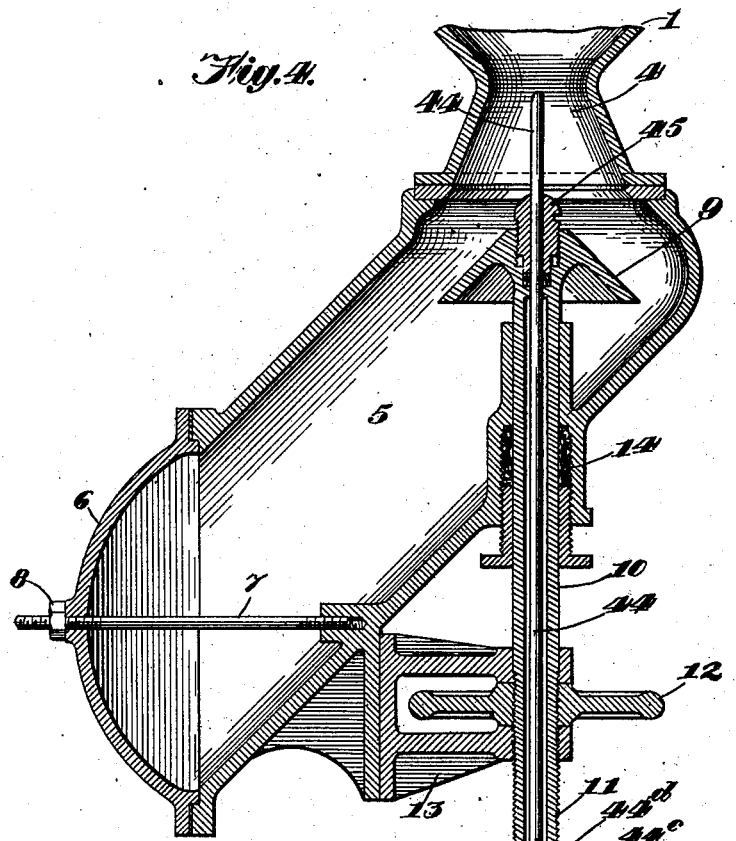
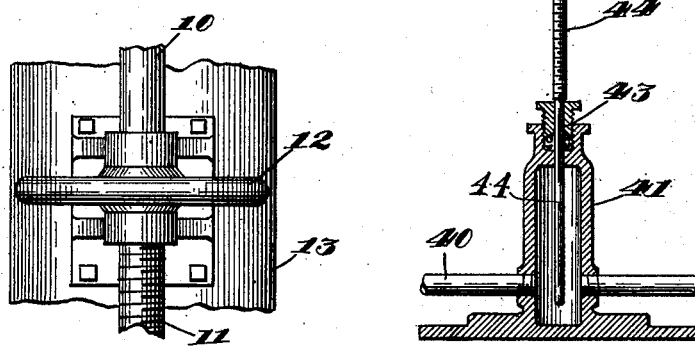

No. 762,868. PATENTED JUNE 21, 1904.
H. A. ALLEN.
APPARATUS FOR SEPARATING MATERIALS OF DIFFERENT GRAVITIES.
APPLICATION FILED JULY 23, 1902.
NO MODEL. 4 SHEETS—SHEET 4.

Witnesses:
J B Weir
O M Nimmis

Inventor:
Henry A. Allen
By Dan'd H Fletcher
Atty.

No. 762,868. Patented June 21, 1904.

UNITED STATES PATENT OFFICE.

HENRY A. ALLEN, OF CHICAGO, ILLINOIS.

APPARATUS FOR SEPARATING MATERIALS OF DIFFERENT GRAVITIES.

SPECIFICATION forming part of Letters Patent No. 762,868, dated June 21, 1904.

Application filed July 23, 1902. Serial No. 116,672. (No model.)

*To all whom it may concern:*

Be it known that I, HENRY A. ALLEN, of Chicago, in the county of Cook and State of Illinois, have invented certain new and useful Improvements in Apparatus for Separating Materials of Different Gravities, of which the following is a full, clear, and exact description, reference being had to the accompanying drawings, forming a part of this specification, in which similar numerals of reference in the different figures indicate like parts.

My invention has reference more especially to ore-separators; and my object is to construct such a device as will enable me to utilize the principle of the vortex whirl in conjunction with the agitating and separating action caused by the passage of a gaseous fluid or a gaseous fluid and a liquid through the mass to be treated. To these ends I provide a closed circular vessel having eduction-openings at the lower and upper parts, respectively, with means for introducing the material or materials to be separated or treated, together with a fluid or fluids under pressure, the fluid or fluids being introduced in such a manner, preferably tangentially to the body of the vessel, and under such pressure as to cause an agitating action, thereby tending to cause a more complete and rapid separation of the particles of different specific gravities in the mass to be treated.

A further object is to provide such means that for the most part the fluid or fluids used may be regained and again used at will. Moreover, my purpose is to enable any desired pressure within practical limits to be maintained in the separator, all of which is hereinafter more particularly described, and specifically pointed out in the claims.

Figure 10:
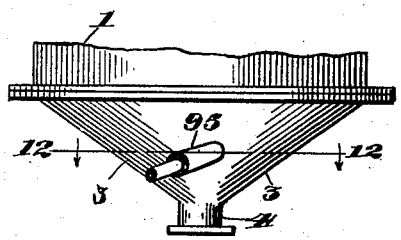
Figure 12:
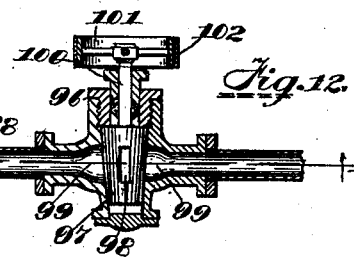
Figure 11:
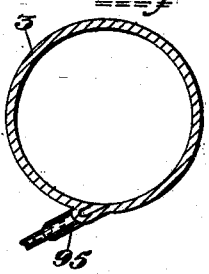
Figure 13:
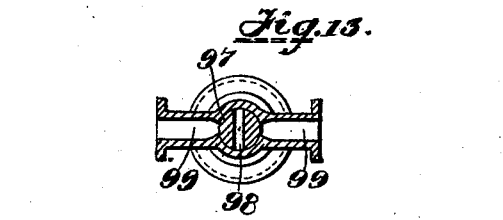

In the drawings, Figure 1 represents a side elevation of my improved separator, together with a compressor used in conjunction therewith. Fig. 2 is a sectional plan view thereof, taken upon the line 2 2, Fig. 1. Fig. 3 is a vertical sectional view of a part of the lower portion of the receiver, taken upon the line 3 3, Fig. 2. Fig. 4 is a vertical sectional view in detail, showing the outlet of the receiver, together with an inlet-pipe and closing and regulating mechanism, all upon an enlarged scale. Fig. 5 is an enlarged side view in detail of the regulating hand-wheel and connecting parts. Fig. 6 is a detail view, partly in longitudinal section, of an adjustable nozzle. Figs. 7 to 10, inclusive, are views showing varying modifications as to the manner in which the inlet-pipes may be disposed. Fig. 11 is a sectional plan view in detail, taken upon the line 11 11, Fig. 10. Fig. 12 is a longitudinal sectional view of a modified form of valve and connecting-pipes; and Fig. 13 is a sectional bottom view thereof, taken upon the line 13 13, Fig. 12.

Referring to the drawings, 1 represents a hollow cylinder, preferably formed of metal, which constitutes the body of my improved separator. Bolted or otherwise attached to suitable flanges upon the respective ends of said cylinder are end pieces 2 3, preferably of conical shape, as shown, the one forming the bottom and the other the top of the separator. A discharge-opening 4 is provided at the bottom, which preferably communicates with an inclined discharge passage or conduit 5, (better shown in Fig. 4,) which is closed at the lower end by means of a removable cap 6, which is secured thereto by means of a suitable rod 7, having a nut 8 at its outer end. A cone-shaped valve or plug 9 is rigidly attached to the upper end of a tube 10, which is projected through the casings of the conduit, the lower portion of said tube being screw-threaded, as shown at 11. A hand-wheel 12, Figs. 1, 4, and 5, is mounted upon said screw-threaded tube and adjusted in bearings in a bracket 13, rigidly attached to the casing. A suitable stuffing-box 14 is provided to prevent leakage. By turning said hand-wheel the tube 10 may be raised or lowered and the valve 9 closed or opened, as desired.

A vertical charging-pipe 15, Figs. 1 and 2, is connected with a jointed fitting 16, which in turn connects with a horizontal pipe 17, arranged tangentially to and in communication with the cylindrical portion of said separator. The charging-pipe 15 is preferably provided with a closing-valve 18 at or near its upper end. The bottom 3 of the separator is made auger-shaped, through which is projected one or more but preferably a series of nozzles 19, Figs. 2 and 3, connected, by means of elbows 20, with pipes 21, 22, and 23, Figs. 1 and 2, having shut-off valves 24, 25, and 26. Said pipes 21, 22, and 23 connect with a fitting 27, which in turn connects with a service-pipe 28 in communication with a closed reservoir 29, a valve 30 being interposed in said pipe. The reservoir 29 is connected, by means of a pipe 31, with the eduction-pipe 32 of a compressor 33, a valve 34 being interposed to shut off communication when desired, as hereinafter described.

Connected with the fitting 16 is a pipe 35, having a nozzle $35^a$, (shown in Fig. 6,) which extends into and is concentric with the pipe 17, said nozzle being rendered adjustable by means of an adjusting-screw 36. A pipe 37, together with suitable fittings shown, serves to connect the pipe 35 with the pipe 28, a valve 38 being interposed between the two. An inlet-pipe 39, having a valve $39^a$, also connects the pipe 28 with the separating-chamber, being located near the top of the latter and tangentially thereto.

Connecting with the fitting 27 is pipe 40, leading downwardly and thence horizontally to a hollow casing 41, into which it is tapped, said pipe 40 being a continuation of the pipe 28 and being provided with a valve 42. The upper part of the casing 41 is provided with a stuffing-box 43, through which is projected a pipe 44, (better shown in Fig. 4,) which is carried upwardly through the tube 10 into the throat of the opening 4 of the separator. Said pipe 44 is open at its upper end for the purpose hereinafter stated. A screw-plug 45, with a suitable stuffing-box, is fitted in the plug 9, through which the pipe 44 passes. A thread $44^a$ is formed upon the said pipe near the lower end, which passes through a hand-nut $44^b$, revolubly secured to the lower end of the pipe 11 by means of a set-screw $44^c$ passing into a groove $44^d$ upon said pipe. The pipe 44 may thus be adjusted to any desired height by turning the hand-nut $44^b$.

Rigidly attached to the top 2 of the separator is a fitting 46, with which is connected a discharge-pipe 47, having a valve 48 therein. The discharge-pipe 47 is in communication with a closed receiver $47^a$, having an outlet $47^b$ normally closed by means of a valve $47^c$. Above the fitting 46 is a chambered dome 49 in communication with said fitting, the upper part of which is connected, by means of a pipe 50, having a shut-off valve 51 therein, with the lower portion of a tank or reservoir 52, the upper portion of which is connected in turn by means of a pipe 53 with the intake-pipe 54 of the compressor 33, a valve 55 being interposed in the pipe 53. A pipe 56, having a shut-off valve 57, enables air or other fluid to be taken from the atmosphere or any suitable source of supply at will. Sediment-pipes 58 59 in the tanks 29 and 52, respectively, enable the sediment to be withdrawn from said tanks at will, valves 60 61 being provided to close said outlets. A pipe 62, having valves 63 64 therein, serves to connect the eduction-pipe of the compressor with the chamber of the part 49. The pipe 62 is intended to be used only for cleaning out the separator. The valves 63 and 64 are normally closed.

Discharge-pipes 65 66, having valves 67 68, are located in the upper part of the body of the separator, substantially as shown, and are designed to be utilized for classifying purposes. The pipe 65 leads into a closed receptacle 69, having a discharge-pipe 70, in which is interposed a shut-off valve 71, while the pipe 66 leads into a like receiver 72, having a like discharge-pipe 73, closed by means of a valve 74.

The operation of my improved apparatus so far as the same has been described is as follows: The material or materials to be separated having been fed into the separator through the feed-pipe 15 and the valves 34, 30, $39^a$, 38, 24, 25, 26, 42, 48, 51, 55, 67, and 68 being opened and the valves 18, 57, 60, 61, 63, 64, $47^c$, 71, and 74 being closed, the compresser 33 is started. Assuming that air or other gaseous fluid is employed, it is forced by the compresser outwardly through the pipe 31, tank 29, and pipe 28 into the separator through the several branch pipes 39, 35, 21, 22, 23, and 44, assuming the several valves to be open, as described. This serves to impart a whirling and otherwise agitating action to the fluids and materials within the separator, whereby the particles of different gravities tend to separate. The air or gaseous fluid passes upwardly through the chamber 49 to the pipe 50, receptacle 52, and pipe 53, back to the compressor, thereby completing a cycle. When the operation has proceeded sufficiently, the particles of heaviest gravity may without stopping the procedure be withdrawn by closing the valve 9 and removing the cap 6. The accumulation in the receptacles $47^a$, 69, and 72 may also be withdrawn by closing the valves 48, 67, and 68, respectively, and opening the valves $47^c$, 71, and 74. Should it be found desirable to vary the amount of or to modify the manner of introducing the inflowing fluid, it may be accomplished by manipulating the valves of the several fluid-induction pipes or by varying the position of the adjustable pipe 44 or the adjustable nozzle within the pipe 17, as may be desired.

Figure 7:
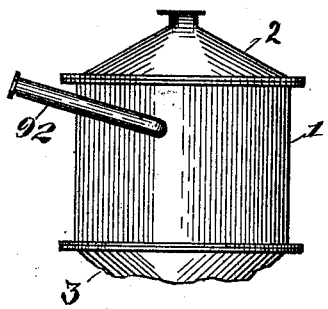
Figure 8:
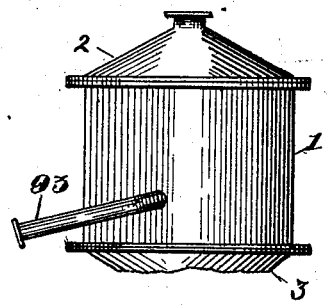
Figure 9:
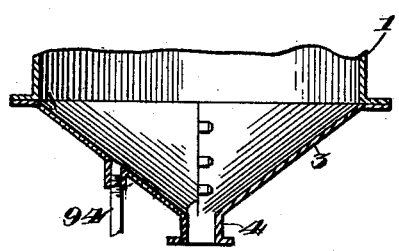

While for the most part the induction-pipes leading to the separator are shown and described as being tangential to the walls of the separator, I do not wish to be confined literally to such construction, as it is obvious that the pipes while arranged substantially tangential may be varied to any position or direction that would result in the fluid-pressure tending to cause a thorough agitation, it being understood that the preponderance of the fluid-pressure shall be in such directions as to cause a turning or whirling movement of the materials to be separated, as hereinbefore described. Such modifications are shown in Figs. 7 to 11, inclusive. In Fig. 8, for example, a pipe 92 is located near the top, and in Fig. 9 a similar pipe 93 is placed near the bottom of the separator, both pipes being shown in planes oblique to the axis of the separator. In Fig. 10 a vertical induction-pipe 94 is shown in the conical-shaped bottom between the central outlet 4 and the periphery, while in Figs. 11 and 12 an inlet-pipe 95 is shown in a plane oblique to the axis of the separator and non-tangential to its periphery. Inlet-pipes so disposed serve to produce a more thorough commotion and separation of the particles to be separated, while not materially interfering with the vortex or whirling action so much desired.

In order to produce a more thorough agitation of the materials within the separator, a rotary valve 96, Figs. 1, 12, and 13, may be interposed in the pipe 28 or in any induction-pipe wherein it may be found desirable to place it. The valve proper consists of a tapered plug 97, Figs. 12 and 13, having a diametrically-disposed port 98 opposite the passage-ways 99 99 in the valve-shell. Upon the valve-stem 100 is fixed a pulley 101, adapted to be rotated by means of a belt connected with any suitable source of power. The result of the rotation of said valve is to produce an intermittent action in the fluid as it is forced into the receiver, thereby intensifying the agitation. Such a valve may be employed either in connection with the gaseous fluid or liquid, or with both, as may be found desirable.

Having thus described my invention, I claim—

1. An ore-separator consisting of a closed circular separating vessel, having a conoidal-shaped top, a closed circulating system leading from said top and back to the body of said vessel where it is connected tangentially thereto, means interposed in said system for forcing a circulation, normally closed discharge-receptacles connected therewith and suitable valves interposed between said discharge-receptacles and said separating vessel, whereby said receptacles may be discharged without interfering with the other actions of said separator.

2. An ore-separator in which is combined a closed separating vessel, means for introducing thereto the materials to be separated, a plurality of closed conduits leading therefrom and thence back thereto, means in operative connection with said conduits for forcing said material through said conduits and separator at a high pressure and velocity, and means for discharging the particles of different gravities without reducing the pressure in the system.

3. In an apparatus of the class described, the combination of a closed circular separating vessel, means for introducing tangentially thereto the materials to be separated, means for discharging the same, a series of eduction-conduits leading axially from the top thereof, induction-conduits leading tangentially thereto, and a pump, the intake of which is formed by said eduction and the discharge by said induction conduits, whereby a vortical circulation is maintained throughout the system, the speed and pressure of which are dependent upon the action of said pump.

4. An ore-separator in which is combined a circular closed vessel, a charging-pipe, means for normally closing the same against back pressure, a discharge-opening at the bottom connecting with a normally closed discharge-receptacle, discharge-openings at higher levels in operative connection with normally closed discharge-receptacles, a fluid-supply reservoir, a pump connected therewith, a series of pipes communicating with said closed vessel and connected with said pump, valves for regulating the flow in said pipes, a chamber connected with the top of said closed separating vessel and a pipe for connecting said chamber with said fluid-supply reservoir.

5. In an apparatus of the class described, the combination with a closed separating-chamber, of means for introducing thereto the materials to be separated, means for discharging said materials at different levels, a series of induction and eduction pipes, the former being arranged tangentially to said separating-chamber, a source of fluid-supply and a pump in operative connection with said induction and eduction pipes whereby a vortex whirl may be imparted to the material within said separating-chamber and the fluid employed therefor used over and over.

In testimony whereof I have signed this specification, in the presence of two subscribing witnesses, this 21st day of July, 1902.

HENRY A. ALLEN.

Witnesses:
D. H. FLETCHER,
C. E. JORDAN.